United States Patent [19]

Kaneko et al.

[11] Patent Number: 4,958,292
[45] Date of Patent: Sep. 18, 1990

[54] PRODUCTION CONTROL SYSTEM FOR MIXED PRODUCTION LINE

[75] Inventors: Kuniya Kaneko; Harumichi Wakiyama, both of Toyota; Tadashi Naito, Nagoya; Toshihiro Ando, Toyota, all of Japan

[73] Assignee: Toyota Jidosha Kabushiki Kaisha, Aichi, Japan

[21] Appl. No.: 183,704

[22] Filed: Apr. 19, 1988

[30] Foreign Application Priority Data

Apr. 22, 1987 [JP] Japan .................. 62-099070

[51] Int. Cl.⁵ .................. G06F 15/24; G06F 15/46
[52] U.S. Cl. .................. 364/468; 364/403; 364/478
[58] Field of Search ........... 364/468, 469, 478, 402, 364/474.11, 401, 403, 148

[56] References Cited

U.S. PATENT DOCUMENTS

| | | | |
|---|---|---|---|
| 4,472,783 | 9/1984 | Johnstone et al. | 364/468 |
| 4,580,207 | 4/1986 | Arai et al. | 364/478 |
| 4,591,983 | 5/1986 | Bennett et al. | 364/403 |
| 4,628,435 | 12/1986 | Tashiro | 364/468 |
| 4,648,023 | 3/1987 | Powell | 364/468 |
| 4,796,194 | 1/1989 | Atherton | 364/478 |
| 4,802,094 | 1/1989 | Nakamura et al. | 364/468 |
| 4,829,445 | 5/1989 | Burney | 364/468 |

OTHER PUBLICATIONS

"A Survey of Scheduling Rules," Panwalkar et al., Op. Research, vol. 25, No. 1, 1/77.
"Multi-Machine, Multi-Product Production Scheduling and Inventory Control," Decision Sciences, vol. 9, No. 4, pp. 577-595, 1978.
"Scheduling in a Two-Stage Manufacturing Process," Narasimhan et al., Int. J. Prod. Res., 1984, vol. 22, No. 4, 555-564.

*Primary Examiner*—Joseph Ruggiero
*Attorney, Agent, or Firm*—Kenyon & Kenyon

[57] ABSTRACT

The present invention provides a production control system of enhanced efficiency which is adapted to a mixed production line wherein products having different specifications are mass produced by assembling different parts on a common assembly line. This system is used in a factory wherein different products are required for steps of production. As a result, a production control plan can be scheduled in consideration of part transport times between production factories. To this end, the production control system corrects for the required number, transport time, and final production plan schedule. The final production plane schedule is adapted to establish a production ratio that is an integral number in each of feed cycles in a revolution of the assembly line. To this end, unreserved areas are provided in the feed cycles.

9 Claims, 21 Drawing Sheets

FIG. 6

| Required Number Of Engines | 1st (Mon.) | 2nd (Tue.) | 3rd (Wed.) | 4th (Thu.) | 5th (Fri.) | 6th (Sat.) | 7th (Sun.) | 8th (Mon.) | 9th (Tue.) | 10th (Wed.) | 11th (Thu.) | 12th (Fri.) |
|---|---|---|---|---|---|---|---|---|---|---|---|---|
| N (i₁, j₁) | 5 | 5 | 6 | 5 | 5 | 0 | 0 | 10 | 10 | 10 | 9 | 10 |
| N (i₁, j₂) | 14 | 15 | 15 | 14 | 15 | 0 | 0 | 5 | 5 | 4 | 5 | 5 |
| N (i₁, j₂) | 3 | 2 | 3 | 3 | 3 | 0 | 0 | 12 | 13 | 12 | 12 | 12 |
| N (i₂, j₃) | 10 | 10 | 10 | 10 | 9 | 0 | 0 | 6 | 6 | 7 | 6 | 6 |

$i_1, i_2$ : Destinations
$j_1, j_2, j_3$ : Kinds Of Engines

| Day Number | | 1st (Mon.) | 2nd (Tue.) | 3rd (Wed.) | 4th (Thu.) | 5th (Fri.) | 6th (Sat.) | 7th (Sun.) | 8th (Mon.) | 9th (Tue.) | 10th (Wed.) | 11th (Thu.) | 12th (Fri.) | Total |
|---|---|---|---|---|---|---|---|---|---|---|---|---|---|---|
| Original | $N(i_2, j_2)$ | 3 | 2 | 3 | 3 | 3 | 0 | 0 | 12 | 13 | 12 | 12 | 12 | 75 |
| | $N(i_2, j_3)$ | 10 | 10 | 10 | 10 | 9 | 0 | 0 | 6 | 6 | 7 | 6 | 6 | 80 |
| | $N_T$(Total) | 13 | 12 | 13 | 13 | 12 | 0 | 0 | 18 | 19 | 19 | 18 | 18 | |
| Reclassified * | $N_T^*$(Total) | 13 | 12 | 13 | 13 | 12 | 0 | 5 | 17.022 | 17.967 | 17.967 | 17.022 | 17.022 | |
| | $N^*(i_2, j_2)$ | 3 | 2 | 3 | 3 | 3 | 0 | 3.333 | 8.667 + 2.752 | 10.248 + 1.888 | 10.112 + 1.304 | 10.696 + 0.652 | 11.348 | 75 |
| | $N^*(i_2, j_3)$ | 10 | 10 | 10 | 10 | 9 | 0 | 1.667 | 4.333 + 1.270 | 4.730 + 1.101 | 5.899 + 0.652 | 5.348 + 0.326 | 5.674 | 80 |

Advance Period: 8th–12th

FIG. 9

| Number \ Day | 1st (Mon.) | 2nd (Tue.) | 3rd (Wed.) | 4th (Thu.) | 5th (Fri.) | 6th (Sat.) | 7th (Sun.) | 8th (Mon.) | 9th (Tue.) | 10th (Wed.) | 11th (Thu.) | 12th (Fri.) |
|---|---|---|---|---|---|---|---|---|---|---|---|---|
| Reclassified Number N (I2, J2) | 3(1) | 2(2) | 3(3) | 3(4) | 3(5) | 0 | 3.333 | 8.667(8) | 10.248(9) | 10.112(10) | 10.696(11) | 11.348(12) |
| | | | | | | | | 2.752(9) | 1.888(10) | 1.304(11) | 0.652(12) | |
| | 1(2) | 1.5(3) | 1.5(4) | 1.5(5) | 1.665(8) | | 5.709 (8) | 6.068(9) | 5.706(10) | 5.674(11) | 5.674(12) | |
| | 1.5(3) | 1.5(3) | 1.5(4) | 1.5(5) | 2.9575(8) | | 2.575(8) | 4.18(9) | 4.40(10) | 5.022(11) | | |
| | | 1.5(4) | 1.5(5) | 5.70908(8) | 8.82(9) | | 2.752(9) | 1.888(10) | 1.304(11) | 0.652(12) | | |
| | | | 1.5(5) | 1.665(8) | 1.665(8) | | | | | | | |
| Shipping Number | 1(2) | 1.5(3) | 1.5(4) | 1.5(5) | 1.665(8) | 0 | 0 | 4.18(9) | 4.404(10) | 5.022(11) | 6 | |
| | 1.5(3) | 1.5(4) | 1.5(5) | 2.10475(8) | 2.9575(8) | | | 7.596(10) | 6.978(11) | 6.326(12) | | |
| | 1.25(3) | 1.5(4) | 1.5(5) | 2.93125(8) | 2.93125(9) | | | 4.18(9) | | | | |
| | | | 1.5 5 | 3.60475(8) | 5.88895(9) | 0 | 1.708(10) | | 4.404(10) | 5.022(11) | | |
| | | | | | | | | 5.888(10) | 5.69(11) | 0.652(12) | 5.694(12) | |
| | | | | | | | | | 1.287(11) | | | |
| | | | | 3(5) | 1.111(8) | | | 10.292(10) | 0.713(11) | | | |
| Production Entering Number | 2.75(3) | 3(4) | 3.21675(8) | 7.67325(8) | 10.06875(9) | 0 | | | 1.287(11) | 0.652(12) | | |
| | | | | 2.93(8) | 1.708(10) | | | | | | | |

↑ To Production Entering For 3rd, 4th And 5th Days

↓ (i, e. 3.333 On 7th Day)

| Unit Number | 1 | 2 | 3 | 4 | 5 | 6 | 7 | 8 | 9 | 10 |
|---|---|---|---|---|---|---|---|---|---|---|
| Code | ␣ | ␣ | 1 | E | − | P | 5 | 1 | A | ␣ |

Equating Condition Unit

| Unit | Priority | Restricting Code |
|---|---|---|
| 1 | 2 | E ⟶ E, T |
|   |   | T ⟶ T, E |
| 3 | 3 | 1 ⟶ 1 |
| 6 | 4 | P ⟶ P |
| 8 | 1 | 0 ⟶ 0, 7 |
|   |   | 7 ⟶ 7, 0 |

| Unit | Priority | Equating Code |
|---|---|---|
| 1 | 2 | E, T |
| 3 | 3 | 1, 2 |
| 6 | 4 | E, L, P |
| 8 | 1 | 0, 1, 2, 7 |

FIG. 15

| Combination Code | Number Of Planned Production | Combination Code | Number Of Planned Production |
|---|---|---|---|
| ␣␣1E-P51A␣ | 9 | ␣␣2E-L20C␣ | 10 |
| ␣␣1E-P52␣␣ | 96 | ␣␣2E-E10␣␣ | 86 |
| ␣␣1E-P52C␣ | 5 | ␣␣2E-E10C␣ | 17 |
| ␣␣1E-P52D␣ | 68 | ␣␣2E-E20C␣ | 48 |
| ␣␣2E-P51A␣ | 7 | ␣␣2E-E30␣␣ | 0 |
| ␣␣2E-P61A␣ | 1 | P␣2E-E30␣␣ | 0 |
| ␣␣2E-P52␣␣ | 19 | ␣␣2E-E51␣␣ | 41 |
| ␣␣2E-P52C␣ | 1 | ␣␣2E-E51G␣ | 0 |
| ␣␣2E-P52D␣ | 6 | ␣␣2E-E51GP | 0 |
| ␣␣2E-P62␣␣ | 10 | ␣␣2E-E51P␣ | 0 |
| ␣␣2E-P77␣␣ | 5 | ␣␣2E-E51N␣ | 56 |
| ␣␣2E-P77C␣ | 3 | ␣␣2E-E51SP | 6 |
| ␣␣2E-P10␣␣ | 39 | ␣␣2E-E61␣␣ | 1 |
| ␣␣2E-P10P␣ | 65 | ␣␣2E-E61G␣ | 0 |
| ␣␣2E-P10PC | 11 | ␣␣2E-E61GP | 0 |
| ␣␣2E-P10YC | 0 | ␣␣2E-E61P␣ | 3 |
| ␣␣2E-P20␣␣ | 16 | ␣␣2E-E52␣␣ | 124 |
| ␣␣2E-P20P␣ | 87 | ␣␣2E-E52C␣ | 71 |
| ␣␣2E-P20PC | 3 | ␣␣2E-E52D␣ | 163 |
| ␣␣2E-P30␣␣ | 19 | ␣␣2E-E62C␣ | 23 |
| E␣2E-P10␣␣ | 11 | | |
| E␣2E-P10P␣ | 33 | | |
| E␣2E-P20P␣ | 23 | | |
| T␣2E-P10␣␣ | 27 | | |
| T␣2E-P20␣␣ | 10 | | |
| ␣␣2E-L10␣␣ | 123 | | |
| ␣␣2E-L10C␣ | 10 | | |
| ␣␣2E-L10Y␣ | 0 | | |
| ␣␣2E-L20␣␣ | 176 | | |

FIG.16

| Combination Code | Number Of Planned Production | Grouped Combination Code | Total |
|---|---|---|---|
| ␣␣1E-P51A␣ | 9 → | ␣␣1E-P@1@@ | 9 |
| ␣␣1E-P52␣␣ | 96 ⎫ | ␣␣ | |
| ␣␣1E-P52C␣ | 5 ⎬→ | ␣␣1E-P@2@@ | 169 |
| ␣␣1E-P52D␣ | 68 ⎭ | | |
| ␣␣2E-P51A␣ | 7 ⎫→ | ␣␣2E-P@1@@ | 8 |
| ␣␣2E-P61A␣ | 1 ⎭ | | |
| — | — | — | — |
| — | — | — | — |
| — | — | — | — |
| — | — | — | — |
| — | — | — | — |

FIG. 17A

1st-Priority   8th-Unit

| Code | Absolute Rate | Integer Rate |
|---|---|---|
| 0 | 5 3 . 2 | 5 3 |
| 1 | 8 . 3 | 8 |
| 2 | 3 8 . 1 | 3 8 |
| 7 | 0 . 4 | 0 |
| ? |  | 1 |

( Total  100 )

FIG. 17B

2nd-Priority   1st-Unit

| 8th-Unit | Integer Rate | Code | Absolute Rate | Integer Rate |
|---|---|---|---|---|
| 0 | 53 | T | 2 . 2 | 2 |
|  |  | E | 4 . 3 | 4 |
|  |  | ␣ | 4 6 . 5 | 4 6 |
|  |  | ? |  | 1 |

( Total  53 )

FIG.17C

3rd-Priority  3rd-Unit

| 8th-Unit | Integer Rate | 1st-Unit | Integer Rate | Code | Absolute Rate | Integer Rate |
|---|---|---|---|---|---|---|
| 0 | 53 | T | 2 → | 2 | 2 | 2 |
|  |  | E | 4 → | 2 | 4 | 4 |
|  |  | ␣ | 16 → | 2 | 46 | 46 |
|  |  | ? | 1 | ? |  | 1 |

FIG.17D

4th-Priority  6th-Unit

| 8th-Unit | 1st-Unit | 3rd-Unit | 6th-Unit | |
|---|---|---|---|---|
| Code/Rate | | | | Integer Rate |
| 0 / 53 | T / 2 → | 2 / 2 → | P / 2 | 2 |
|  | E / 4 → | 2 / 4 → | P / 4 | 4 |
|  | ␣ /46 → | 2 /46 → | P / 15.8 → | 15 |
|  |  |  | E / 9.7 → | 9 |
|  |  |  | L / 20.5 → | 20 |
|  |  |  | ? | 2 |

FIG.17E

| 8th-Unit | 1st-Unit | 3rd-Unit | 6th-Unit |
|---|---|---|---|
| Code/Rate | ← | ← | ← |
| O / 53 % | T/ 2 % | 1 /11 % | P/34 % |
| 1 / 8 | E/ 4 | 2 / 86 | E /39 |
| 2 / 38 | ⌴/92 | | L /20 |
| 7 / 0 | | | |
| ? / 1 | ? / 2 | ? / 3 | ? / 7 |

FIG. 18

| Unit: | 8 | 1 | 3 | 6 |
|---|---|---|---|---|
| Code / Rate | O / 53 ⎫ | T / 2 ⎫ | I / 11 ⎫ | P / 34 ⎫ |
| Restricted Group | 7 / 0 ⎬ 54 | E / 4 ⎬ 8 | ? / 3 ⎬ 14 | ? / 7 ⎬ 41 |
| | ? / 1 ⎭ | ? / 2 ⎭ | | |
| Unrestricted Group | 1 / 8 ⎫ 46 | ⌐ / 92 ⎫ 92 | 2 / 86 ⎫ 86 | E / 39 ⎫ 59 |
| | 2 / 38 ⎭ | | | L / 20 ⎭ |

FIG. 19

| Unit | Code | Calculating Order | | | |
|---|---|---|---|---|---|
| | | 1st | 2nd | 3rd | ----- |
| 8 | 0 | 5 3 ☆ | 6 | 5 9 ☆ | |
| | 1 | 8 | 1 6 | 2 4 | |
| | 2 | 3 8 | 7 6 ☆ | 1 4 | ------ |
| | 7 | 0 | 0 | 0 | |
| | ? | 1 | 2 | 3 | |
| 1 | T | 2 | 4 | 6 | |
| | E | 4 | 8 | 1 2 | |
| | ␣ | 9 2 ☆ | 8 4 ☆ | 7 6 ☆ | ------ |
| | ? | 2 | 4 | 6 | |
| 3 | 1 | 1 1 | 2 2 | 3 3 | |
| | 2 | 8 6 ☆ | 7 2 ☆ | 5 8 ☆ | ------ |
| | ? | 3 | 6 | 9 | |
| 6 | P | 3 4 | 6 4 ☆ | - 2 | |
| | E | 3 9 ☆ | - 2 2 | 1 7 | |
| | L | 2 0 | 4 0 | 6 0 ☆ | ------ |
| | ? | 7 | 1 4 | 2 1 | |
| Adopted Combination Code | | ␣␣2E-E?O?? | ␣␣2E-P?2?? | ␣␣2E-L?O?? | ------ |

Unrestricted (Unit) — Restricted (Code)

FIG. 20

| Order | Combination Code |
|---|---|
| 1 | ␣ ␣ 2 E — E ? O ? ? |
| 2 | ␣ ␣ 2 E — P ? 2 ? ? |
| 3 | ␣ ␣ 2 E — L ? O ? ? |
| 4 | ␣ ␣ 2 E — E ? 2 ? ? |
| 5 | ␣ ␣ 2 E — P ? O ? ? |
| 6 | ␣ ␣ [?] E — [?] ? 1 ? ? |
| 7 | ␣ ␣ 2 E — E ? O ? ? |
| 8 | ␣ ␣ 2 E — P ? 2 ? ? |
| 9 | E ␣ 2 E — P ? O ? ? |
| 10 | ␣ ␣ 2 E — E ? 2 ? ? |
| ⋮ | ⋮ |
| 90 | ␣ ␣ 2 E — E ? O ? ? |
| 91 | ␣ ␣ 2 E — E ? 2 ? ? |
| 92 | ␣ ␣ 2 E — [?] ? O ? ? |
| 93 | ␣ ␣ 2 E — E ? 2 ? ? |
| 94 | E ␣ 2 E — P ? O ? ? |
| 95 | ␣ ␣ 2 E — E ? 1 ? ? |
| 96 | ␣ ␣ 2 E — L ? O ? ? |
| 97 | ␣ ␣ 1 E — P ? 2 ? ? |
| 98 | ␣ ␣ 2 E — L ? O ? ? |
| 99 | ␣ ␣ 2 E — E ? 2 ? ? |
| 100 | ␣ ␣ 2 E — P ? O ? ? |

FIG. 21

| Order | Combination Code |
|---|---|
| 1 | ␣ ␣ 2 E - E 1 O ␣ ␣ |
| 2 | ␣ ␣ 2 E - P 5 2 ␣ ␣ |
| 3 | ␣ ␣ 2 E - L 2 O ␣ ␣ |
| 4 | ␣ ␣ 2 E - E 5 2 D ␣ |
| 5 | ␣ ␣ 2 E - P 2 O P ␣ |
| 6 | ␣ ␣ [2] E - [E] 5 1 N ␣ |
| 7 | ␣ ␣ 2 E - E 2 O C ␣ |
| 8 | ␣ ␣ 2 E - P 6 2 ␣ ␣ |
| 9 | E ␣ 2 E - P 1 O P ␣ |
| 10 | ␣ ␣ 2 E - E 5 2 ␣ ␣ |
| ⋮ | ⋮ |
| 1532 | ␣ ␣ 1 E - P 5 1 A ␣ |

PRODUCTION CONTROL SYSTEM FOR MIXED PRODUCTION LINE

BACKGROUND OF THE INVENTION

1. Field of the Invention

The present invention relates to a production control system suitable for use in manufacturing plants wherein a great variety of parts and assemblies are assembled to form products, such as automobiles.

The present invention also relates to a production schedule planning system for a mixed production line and particularly when a mix of different types of products are produced by assembling parts delivered from respective operation tables arranged along an assembly line, the delivery sequences of the parts are restrained and equated in a predetermined manner.

2. Description of the Prior Art

An automobile is an assembly of a great number of parts. In general, the production process for automobiles comprises the steps of assembling individual parts to form a sub-assembly (for example, an engine) and then incorporating that sub-assembly into another assembly (for example, a vehicle body). Such steps are repeated with other parts and sub-assemblies to complete an automobile as a final product. The recent development of producing various automobile models complicates the process by requiring a wide variety of parts having variable specifications for successive sub-assemblies at a given operation table.

In the accompanying drawings, FIG. 1 shows a model of a production process wherein many types of cars are to be produced. For example, in considering which parts or assemblies are to be incorporated into vehicle bodies AM, it is found that a plurality of engines EG/1-EG/N may be incorporated into the automobiles or vehicle bodies AM and that each of the engines EG/1-EG/N are themselves composed of plural parts a-n.

The assembly operations of these parts a-n and engines EG/1-EG/N usually are not performed on a single production line to obtain final products; instead the assembly operations are mostly separated into specialized production lines. This specialization necessarily involves transportation of parts or engines between a production factory and temporary storage spaces making it difficult to have a smooth flow of parts or engines on the production line. It is well-known in the art that some production control is desired.

FIG. 2 illustrates a set of specialized production lines for producing various types of automobile sub-assemblies. An engine producing factory 30 produces engines EG/1-EG/N as outgoing products on a production line 31 with the use of individual parts a-n which have been supplied from separate parts factories. The various types of engines EG/1-EG/N will not move on the production line 31 in a uniform manner, but engines of different types will be fed at a rate corresponding to the number of engines of each type required by one of the other assembly factories (hereinafter called the "required number"). Therefore, the required number corresponds to the rate of production of each type of engine on the production line 31 per unit time. Each of the engines EG/1-EG/N emerging from the production line 31 is subjected to an inspection step 32 and then stored temporarily in a storage space 33.

Thereafter, the required number $N(i, j)$ of engines EG/1-EG/N which are classified into the different engine types $j/1-j/n$, are transported to each of the destined factories (vehicle factories) $i/1-i/n$ by any suitable transporting means such as trucks or the like.

Each of the destined factories $i/1-i/n$ will then produce the desired automobiles by incorporating the engines EG/1-EG/N into the vehicle bodies that are on its own production line (41 or 42) in order to match the production schedule of that factory.

In such a production system, the sub-assemblies must be supplied to the destined factories in the proper quantities so that the required types of automobiles will be smoothly produced in each factory by the required delivery time. To this end, automobile manufacturing factories utilize production controls based on data relating to the delivery of parts, i the number of parts or sub-assemblies required by each of the destined factories, as well as other data.

The general production control system 50 is a concentrated control system using a computer and a processing program which has previously been prepared by inputting necessary data into the computer through a console 51. FIG. 22 shows a flow chart of a conventional production control program. A production control system in the prior art will now be described with respect to the production of engines EG/1-EG/N.

In FIG. 22, data relating to the required number of engines that are to be produced in an engine producing factory 30 (hereinafter called "production factory sometimes) is inputted in the computer through the console (Step 100). Various productive conditions (including the type of engine, the number of cars to be produced and other factors) relating to the engine producing factory 30 are then inputted into the computer (Step 101). Based on this inputted data, the required number of engines are edited and classified into the required types of different products (Step 102). Subsequently, the productive conditions are processed one at a time (Step 103) and the production order of the different sub-assemblies that are to be produced 31 (that is, the productive order) is passed along to the leading end of the production line (Step 104). The engines are produced on the production line 31 in accordance with such instructions. Thus, a plurality of engine types will move on the production line 31 at a predetermined rate of emergence.

The aforementioned production control system of the prior art has the following problems. First, the number of engines that must be produced, i which is inputted at Step 100, is determined by the arrival time of the engines at each of the destined factories ($i/1-i/n$). As shown in FIG. 2, the destined factories are all at different locations. Thus, i different periods of time are required to transport the engines from the engine producing factor 30 to the destined factories $i/1$ -$i/n$. In spite of this added complexity, the prior art did not take it into account when determining the required number of engines for each destination. As a result, when the number of engines to be produced is calculated, according to the schedule of the particular engine factory, a discrepancy will be created with respect to time. Thus, the overall number of engines required by all the destined factories $i/1-i/n$ will not necessarily coincide with the overall number of engines produced ion the engine producing factory 30. This results in the under-production or the over-storage of the engines EG/1-EG/N in the storage space 33 of the engine producing factory 30. This discrepancy will also influence the delivery of parts 1-n, creating as unstable production condition such that the parts will be supplied to the engine factory 30 in an excessive or insufficient amount.

The second problem in the prior art production control system is that the progress of production in each of the production factories, including the engine factory 30, is not taken into consideration. If any undesirable event (such as a malfunction in the production facilities) takes place in the engine factory 30 or one of the other destined factories i/1–i/n, the required number of engines inputted at step 100 cannot be updated, and production will continue without a rapid increase of the total stock in the storage space 33 of the engine producing factory 30. Whatever the case may be, the engine producing factory 30 may over-produce only one specific type of engine and thus make the production and physical distribution unstable.

The third problem in the prior art is that a plurality of productive conditions are only processed one at a time at Step 104. Engines EG/1–EG/N should be produced on the production line 31 at a rate matched to the schedule of production. For example, if the proportion of the produced engines EG/1 to EG/2 is 1 : 1, the engines EG/1 and EG/2 should emerge alternately on the production line 31. However, some event may occur so that two engines of type EG/2 are successively produced after only one engine EG/1 has emerged from the production line. This result is a consequence of the fact that cumulative errors will occur if many different types of engines are to be produced on the same production line 31, because the ratio of the different types of engines produced will not be an integer number. Subsequent sequence of production is determined from the previous sequence and thus the next type of engine to be produced is determined by comparing the rates of production with each other.

In order to apply the recent mass-production system used for producing various types of products, a mixed production line is used in practice on which products of different types or different specifications are assembled, in contrast to the prior ar job-lot production.

Such a mixed production line may be used for the manufacture of various products, including automobiles, engines, electric home appliances and the like.

In particular, automobiles or engines thereof, require a great number of different parts which are to be assembled and which should be properly supplied in accordance with a predetermined production schedule. In such cases, it is very important that the assembling sequence of the different parts be appropriately established.

If the delivery of parts is not properly performed, either a shortage of parts will be created, or over-storage of parts will occur, or there will be other inconveniences. These undesirable events result in a decrease in the production efficiency of the production line or the parts manufacturing factory.

Because the mixed production line has an increased variability with respect to the time required to assemble or work different parts, it is preferable that those parts requiring a longer assembly or work time and those requiring a shorter assembly or work time be supplied to the production line in an alternate manner as much as possible, or, alternatively, at a constant rate.

Such a condition in the assembling operation is known as a restraint condition. For example, if electronic fuel injectors (EFI) and carburetors are manufactured on the same engine assembly line, a restraint condition inhibiting the successive assembly of EFI's is required since the assembling of EFI's requires a very long period of time. An assembly line that successively produces only some EFI's is undesirable.

On the other hand, the parts manufacturing section is preferably required to produce various types of parts in as equal a number as possible. It is also desirable to provide an assembly line on which the various types of parts can be combined and arranged so that they will be assembled with equal frequency.

Such a requirement from the parts manufacturing section is known as an equating condition. It is desirable that the permutations and combinations of parts supplied to the respective operation tables satisfy the equating condition.

FIGS. 3 exemplifies a mixed production line in which a rotary 52 forms an assembly line along which a number of operating tables A, B, C ... are located. Each of the tables receives parts from an associated source. When the assembly line completes a rotation, a product will be assembled which is determined by the parts supplied. If the parts are supplied to the respective operating tables in a preselected order, it is possible to mass-produce products with the desired specifications in a mixed assembly line operation.

It is usually preferred that a group of parts which are classified into the same category (for example, in the automobile assembly line), normal carburetor and EFI parts be supplied to the same operating table.

The aforementioned rotary 52 normally includes a given number of operation tables around it. For example, one rotary includes 100 tables. Such a rotary can repeatedly produce 100 products which have different specifications by repeating a delivery cycle to the rotary that corresponds to one assembly line cycle, for example, a delivery cycle through which 100 parts are supplied to the assembly line.

As previously described in connection with FIG. 1, by considering which parts or assemblies are incorporated into an automobile AMl, it is realized that one of a plurality of engines EG/1–EG/N may be incorporated into each of the automobiles AM/1 and that each of the engines EG/1–EG/N is composed of a plurality of parts a–n. In the production process, various types of parts are combined with one another, therefore, the delivery of parts should be properly influenced by the various models of automobiles having different specifications that are to be produced on a single assembly line.

As is well-known in the art, the assembly of parts a–n and engines EG/1–EG/N are not performed on a single production line. The assembly operations are usually separated into specialized production lines. The specialization of production lines is necessarily accompanied by a transportation of parts or engines between each manufacturing plant and a temporary storage space. Such a factor prevents the smooth flow of parts and engines to the production lines. It is well-known in the art that some production control is desired.

Normally, parts are supplied to a production line from a plurality of manufacturing factories or storage spaces. The parts should be delivered in the proper quantities in a manner matching their movement along the assembly line. At this time, the requirement of parts on the assembly line may not necessarily coincide with their delivery rate on the production side. This is a very important problem affecting the sequence of parts supplied to the operating tables around the assembly line that also affects both the producing and assembling sections.

In view of both the production and storage sides, it is preferable to equate the required frequency of emergence of the parts on the mixed production line, thereby improving the efficiencies of the storage and production facilities. This will be apparent by considering an example where a production schedule is used in which only specific parts are consumed for one day during a week, parts producing facilities must be enlarged and storage spaces must be correspondingly increased.

The equating requirements of the parts in such a mixed production line are extremely important in order to increase the overall efficiency of production.

On the other hand, it is preferable that the time required to assemble or work parts on the operation tables be equal since the assembly line or rotary 52 moves at a constant speed, as is apparent from FIG. 3. However, the mixed production line cannot usually have such equal times. As described before, the equality cannot be prevented also by a difference between times required to produce the carburetors and times required to produce EFI's.

As described before, it is necessary that parts having different operational difficulties be supplied in such a way as to equalize the overall operational time in the production line. In practice, such a condition can be fulfilled by supplying parts requiring a difficult operation in a sequence that is not successive, that is, by fulfilling the aforementioned restraint condition.

As is well-known, the production of automobiles is executed on a production schedule developed for a specific day. This daily schedule is planned by considering the monthly, weekly and daily production schedules in conjunction with data obtained up until that day, data such as production results and the like. A parts delivery program will be planned based on this planned production schedule. For example, if a production schedule for 1500 automobiles per day is planned with respect to a specific assembly line, and assuming that this assembly line includes 100 operating tables, the desired production is accomplished by fully rotating the assembly line 15 times per day. Parts are supplied to the assembly line in a manner reflecting the different specifications allocated to the 1500 automobiles to be produced.

In FIG. 3, the final products are shown as a combination of "a/1, b/1, c/1 . . . . " or "a/2, b/2, c/2 . . . . " each of which are used to specify a particular part.

Accordingly, the combination of parts or units (hereinafter called "combination code") required is first established based on the production schedule. The arrangement and row order are then established with respect to these combination codes in order to determine a sequence or production order for products having different specifications. Subsequently, by specifying the parts that are to be delivered to their respective tables in accordance with this established sequence of combination codes, the desired product can be assembled during the movement of the rotary 52 through a complete rotation.

In the schedule planning method of the prior art, however, both the aforementioned equating and restraint conditions could not be fulfilled since all the necessary factors were incorporated into a given period of production, such as a daily production schedule, for example. The arrangement and sequence of the combination codes used to determine the final production plan was determined only by using one of the above conditions and this was typically the equating condition.

The equating condition requires that the necessary parts emerge from the production line with equal frequency as much as possible. On the other hand, the restraint condition relates to the periods of time required at each of the operating tables during the assembling or working of the parts. It is known in the art that the equating and restraint conditions are frequently inconsistent with each other.

Since no combination or row order which can fulfill both these inconsistent conditions can be obtained, the prior art selects and uses only one of the two conditions and usually the equating condition is chosen.

When only the equating condition is used to perform a mixed production in which products consisting of many common parts are to be produced, the sequence of production will be upset if the daily production schedule is highly varied.

Because of the preferential use of the equating condition. The restraint condition is not usually fulfilled. This means that work of greater complexity is successively effected near the end of the production process.

Furthermore, the equating condition is set for a constant period (for example, a daily production cycle) that is independent of the assembly line cycle. As a result, the operating tables will operate according to different parts delivery cycles A row order of parts equal to, for example, 1500 in number must be set for each of the operating tables. This requires a huge arithmetic or data storing operation.

SUMMARY OF THE INVENTION

It is therefore an object of the invention to provide a production control system that can ship products from one factory to the other factories in proper quantities so that a most efficient production can be achieved.

Another object of the present invention is to provide an improved production schedule planning method that can equalize the delivery of parts to a plurality of operating tables around a mixed production line in order to eliminate any stagnation on the assembly line, and which can easily plan a production schedule in a reduced time.

To this end, the present invention provides a production control system suitable for use in a production factory which is to deliver a required number $N(i, j)$ of different types $(j/1-jn)$ of products (EG/1-EG/N) to a plurality of destinations $(i/1-i/n)$ each of which require different lengths of time to receive the products from said production factory, said system being adapted to instruct the production line in said production factory on the scheduled number of products classified into each of said types, said system comprising a required number correcting means (201) for correcting said required numbers based on corrected data which includes data based on the progress of production in each of the destined places or the production factory itself; a transport time evolving means (203) in order to further correct the said required numbers in accordance with the production progress correcting data that results from the difference in transport times relating to said destined places; and a final production plan scheduling means (205) for determining a final production plan for each product to be delivered by correcting said corrected required numbers which depends on the production condition which is inherent in said production factory, and for providing data indicative of the determined final production plan to the production line of said production factory.

In such an arrangement, the required number correcting means (201) corrects the original set of required numbers N(i, j) depending on the progress of production in each of the destinations or the production factory. As a result, the aforementioned second problem can be overcome and appropriate parts or assemblies can be delivered to the production factor in the proper quantities and thus minimizing the capacity of the storage space. Since the transport time evolving means (203) further corrects the required numbers N(i, j) in order to eliminate errors in the determination of the final production plan due to differences in transport times between the production factory and the destinations (i/1–i/n) and also normalizes the times,i the aforementioned first problem can be solved. The appropriate parts or assemblies can be delivered on the production factory in the proper quantities, minimizing the capacity of the storage space. furthermore, since the corrected required numbers N(i, j) are further corrected by the final production plan determining means (205), which is based on the production condition in the production factory itself, the appropriate shipping can similarly be performed and the amount of storage necessary can be minimized. Under the organized function of said various means, the parts and assemblies delivered to the production factory ca be used while maintaining the equated shipping of the parts or assemblies from the same production factory. As as result, the physical distribution between the specialized production sections can be made more equal in order to establish a stabilized production system throughout.

The present invention also provides for the aforementioned final production plan determining means 205, a production schedule planning method for a mixed production line, comprising the steps of sequentially delivering to each of the operating tables arranged along an assembly line in a predetermined order, the same part types having a suitably selected specification, and for determining the arrangement of combination codes and the row order of combination code groups which indicate the selection of parts to be delivered onto the operating tables so that a mix of products with different specifications can be produced on an assembly line by bringing the assembled or worked parts onto the respective operating tables during a revolution of the assembly line, said method being characterized by the steps of determining from the required numbers based on a production schedule, a delivery rate for each of the codes in the delivery cycle relative to one assembly line cycle, allocating each place of said delivery cycle to each of said combination codes in said delivery rate wherein all fractions created therein are collected to form an unreserved place, determining an arrangement of combination codes or row order of combination code groups in each of the delivery cycles based on production restraint and equating conditions, and finally determining the combination code of unreserved places throughout plural delivery cycles.

In accordance with the present invention, the delivery rate of parts or units of the same type is determined by a given production schedule. For example, three different delivery rates with respect to EFI, Normal and Other are determined on a delivery table for carburetor, for example, from a daily production schedule. The present invention is then characterized by the determination of delivery rates by a delivery cycle which corresponds to one assembly line cycle (several fractions of a daily sum or one-tenth or less of a fraction).

The delivery cycles shown in FIG. 3 includes 100 places, corresponding to the number of delivery tables in the assembly line. Although the prior art has not used such delivery cycles to plan a production schedule, the present invention positively determines a basic delivery rate for each delivery cycle.

Thus, the schedule planning method of the present invention can determine, for example, the arrangement and row order of all the combination codes per day by multiplying the arrangement and row order of the combination codes in one delivery cycle several times, since the delivery cycle is set as a reference cycle and because the daily production rate is obtained by multiplying this delivery cycle several times.

When the places forming one delivery cycle are allocated at a said delivery rate, the rate determined from the basic production schedule contains a fraction. The second feature of the present invention is in that such a fraction is not provided as a specific code and remains as an unreserved place.

Each delivery cycle is allocated by a rate having no fraction and which includes an unreserved place.

The allocation of such integrally divided places is then determined based on the production restraint and equating conditions.

The present invention preferentially uses the restraint condition and then establishes the equating condition according to its priorities. Although both the restraint and equating conditions are not fully fulfilled in the present invention, they can be spread over a delivery cycle under a substantially equal state.

After completing the allocation of places in the delivery cycle, codes are provided to parts or units by the same procedure used when said restraint and equating conditions were established for the unreserved places of the delivery cycles which had previously been determined by the daily sum.

Through such a procedure, the production schedule planning method of the present invention can determine the arrangement and row order of combination unit codes that fulfill the restraint and equating conditions equalized through the delivery cycles an can provide a uniform allocation established in the total 9 cycle including a plurality of delivery cycles even with respect to a given cycle, for example, a row order per day.

BRIEF DESCRIPTION OF THE DRAWINGS

FIG. 6 illustrates input data including destinations, classified types, and required numbers of engines at Step 100.

FIG. 7 illustrates a procedure to correct the required engine number when the production is delayed at Step 201.

FIG. 8 illustrates a procedure to correct the required engine number when the production is advanced at Step 201.

FIG. 9 illustrates a procedure to correct the transport time correction at step 203.

FIG. 15 illustrates a relationship between unit codes based on a daily automobile production schedule and the planned number of products to be produced per day.

FIG. 16 illustrates the number of automobiles which are obtained by bundling the number of automobiles shown in FIG. 15 with a coincidence of restraint/equating condition units.

FIG. 17A–17E illustrate a calculation of a rate while retaining fractions as unreserved places.

FIG. 18 illustrates a group of rates grouped according to the restraint and unrestraint conditions with respect to the respective equating conditions.

FIG. 19 illustrates the order determination for obtaining a cycle table by the use of an ordering method according to the present invention.

FIG. 20 exemplifies a cycle table.

FIG. 21 exemplifies a final production plan table.

DETAILED DESCRIPTION OF PREFERRED EMBODIMENTS

Figure 1:
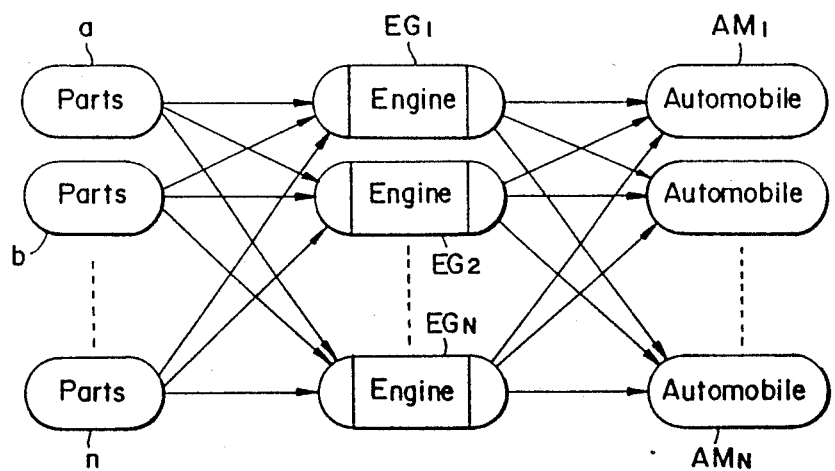
FIG. 1 illustrates combinations of automobiles with engines and parts on a mixed production line to which the present invention is applied.

The present invention will now be described in connection with a production control system which is illustrated in the drawings.

Figure 2:
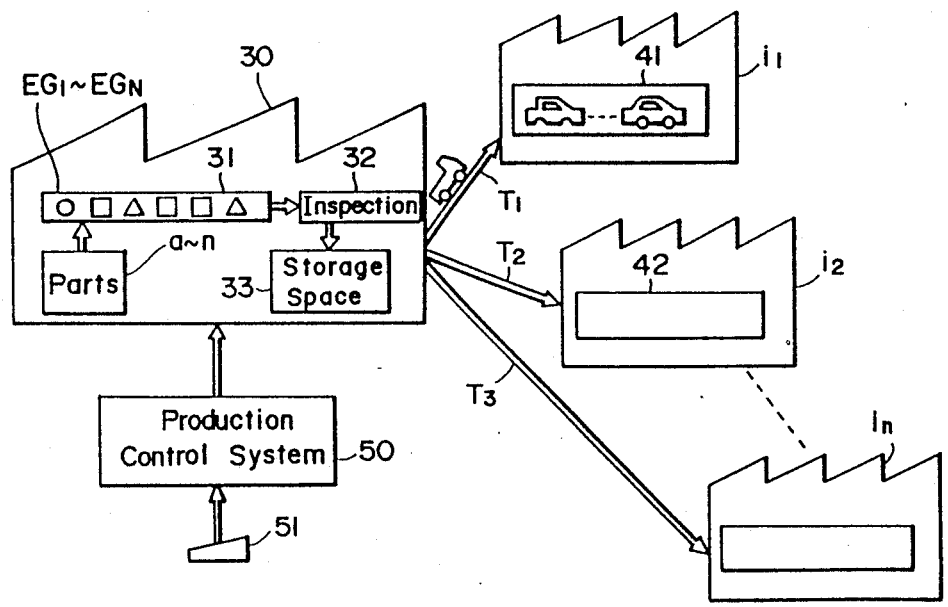
FIG. 2 illustrates specialized automobile production systems in various production factories.
Figure 3:
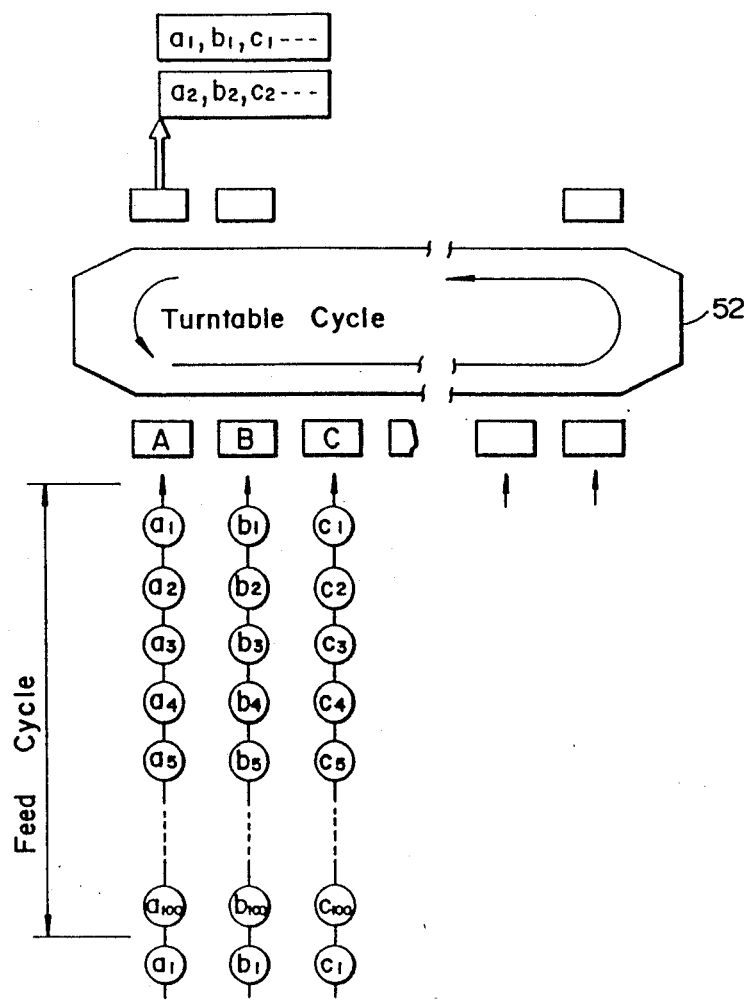
FIG. 3 is a diagram showing the flow of the mixed assembly line.

Relationship Between the Production Control System and The Production Factory A relationship between the production factory 30 and the production control system 50 is shown in FIG. 2 and therefore the further description thereof will not be omitted.

Hardware Arrangement of Production Control System

Figure 4:
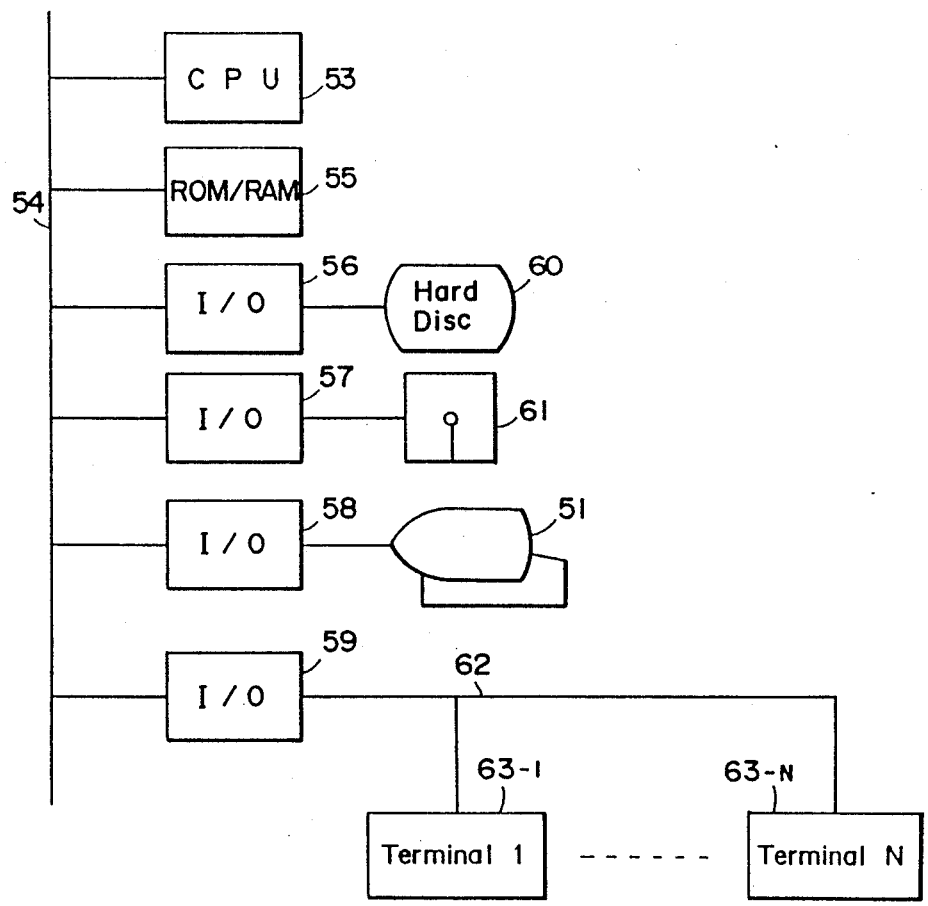
FIG. 4 is a block diagram of a hardware arrangement to be used in a production control system according to the present invention.

FIG. 4 shows a hardware arrangement when a computer is used as the production control system. In FIG. 4, a central processing unit (CPU) 53 is a component which supervises the arithmetic processing required by a production management flow which will be described hereinafter. CPU 53 is connected to a memory 55 through an internal bus 54. The memory 55 includes a read-only memory (ROM) which stores the data required to actuate the CPU 53 itself and a random access memory (RAM) which stores the data required to be read and written at an increased speed. The internal bus 54 is connected with input/output interfaces 56, 57, 58 and 59, which will be called "I/O". I/O 56 is connected to a hard disc 60 that is regularly used to store all the data which is required by the system. I/O 57 is connected to a floppy disc 61 that stores the input data relating to the destinations and the required numbers of each of the classified product groups. I/O 58 is connected to a console 51 which is the same as shown in FIG. 2. I/O 59 is connected to a plurality of production instructing terminals 63/-1–63/-N by a network 62. These terminals are by arranged number at each of the stations or places on the production line 31 of the production factory 30.

The general operation of the production control system will first be described before the details are presented.

The production instruction is performed by manually inputting into the computer all the necessary data through the console 51. The input data is written into the RAM 55 via the internal bus 54. CPU 53 executes a software processing procedure (that is, an arithmetic processing procedure which is required to control the production), by executing a program stored in the ROM 55 while reading the input data stored in the hard disc 60 and the data stored in the floppy disc 61. The results are supplied to the network 62 through the I/O 59 in the form of production instructing data and they are outputted through one of the terminals 63/-1–63/-N, which is instructed for production, will produce engines Eg/1-- EG/N in accordance with the contents of the production command.

Software Processing of the Production Control System

The software arrangement, which is as an essential part of the production control system according to the present invention, will now be described.

Figure 5:
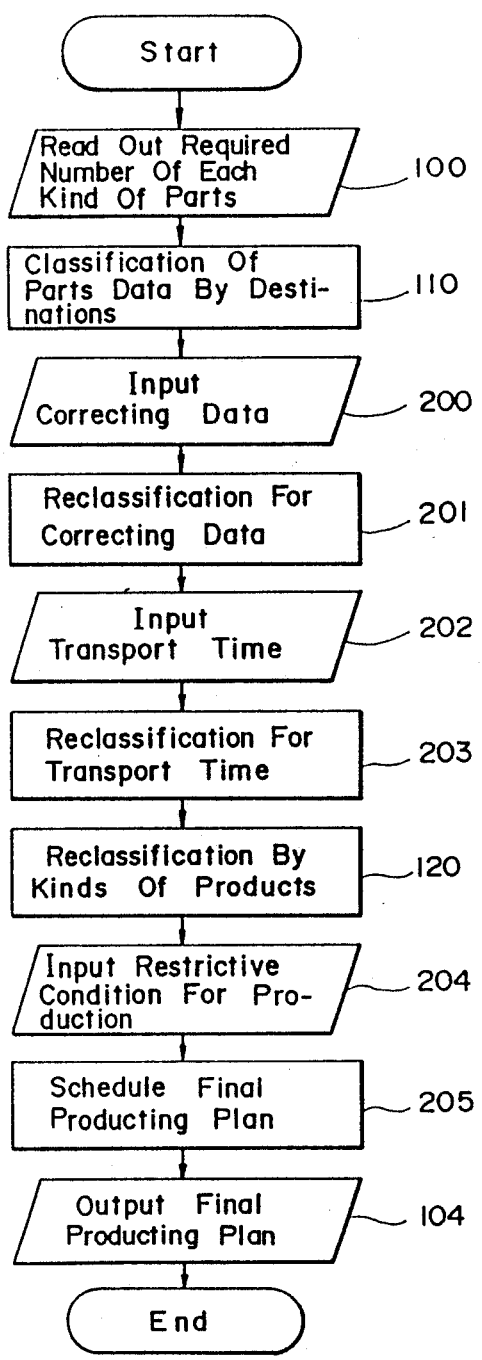
FIG. 5 is a flow chart of one embodiment of the present invention.
Figure 22:
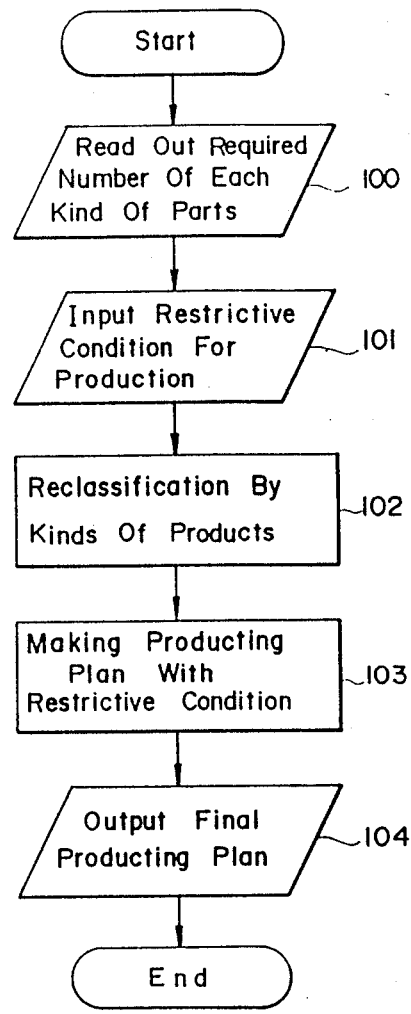
FIG. 22 is a flow chart of one of the prior art production control systems.

FIG. 5 shows one embodiment of a production control system according to the present invention, in which parts similar to those of FIG. 22 (prior art) are denoted by the same reference numerals.

This production control system is broadly divided into five steps: a step 110 for totaling and classifying the required numbers $N(i, j)$ of engines according to destinations $i/1$–$i/n$; a step 201 for correcting the required numbers $N(i, j)$ in accordance with the progress of production at each of the destinations $i/1$–$i/n$ or the production factory 30 itself; step 203 for correcting (or normalizing) the required numbers $N(i, j)$ according to the transport times $T/1$–$T/n$ from the production factory 30 to the respective destinations; a step 120 for totalling and classifying the required number $N(i, j)$ of engines in accordance with the engine types $j/1$–$j/n$; and a final producing plan scheduling step 205 for expanding the corrected required number of engines $N^*(i, j)$ in accordance with the producing condition inherent in the production factory 30 and which is used to determine the final production plan for each of engines EG/A–EG/N to be shipped. This final production plan is used to provide the output data for instructing the production.

The details of the production control system will be described in order.

(Required Engine Number Inputting Step 100.)

At this step 100, the required numbers $N(i, j)$, classified by the destinations $i/1$–$i/n$ and engine types $j/1$–$j/n$, are inputted into the system through the console 51. The required engine numbers $N(i, j)$ which are inputted are exemplified in FIG. 6. Each of these required numbers covers a period for the next twelve days. As seen from FIG. 6, engines of a type $j/1$ are shipped to a destination $i/1$, engines of type $j/2$ are shipped respectively to destinations i/1 and i/2, and engines of type j/3 are shipped only to the destination i/2. Required numbers N(i, j) of engines classified by destinations and types are stored in the floppy disc 61 via the console 51, I/OI 58, internal bus 54 and I/O 57. Subsequently, the stored data is regularly transferred to the hard disc where it is stored. (Required Engine Number Correcting Step 201.)

Step 201 is executed in conjunction with the destination classifying and editing step 110 and the correction data input step 200. The destination classifying and editing step 110 is a processing step at which the individual required numbers N(i, j) stored in the hard disc 60 are read, totaled with respect to each of the destinations i/1 and i/2, and edited with respect to each of the classified destinations in order to provide basic data. The correction data input step 200 is a processing step at which corrected data relating to the previously stored required numbers N(i, j) is inputted into the system by an operator through the console 51 (the contents of the data relate to the progress of production in each of the destinations j/1 and j/2, with the details being described hereinafter). The required engine number correcting step 201 is a processing step at which the required engine numbers (N(i, j) stored in the hard disc 60 are updated to reflect the progress of production at each of the destinations j/1 and j/2 in accordance with the correction data which have been inputted at the step 200.

The required engine number correcting step 201 is also adapted to correct the required numbers of engines N(i, j) (that is, the planned number of products to be produced in the production factory 30) in accordance with the progress of production of each of the destinations i/1, i/2 or production factory 30. An example is shown in FIG. 7.

EXAMPLE 1

Figure 7:
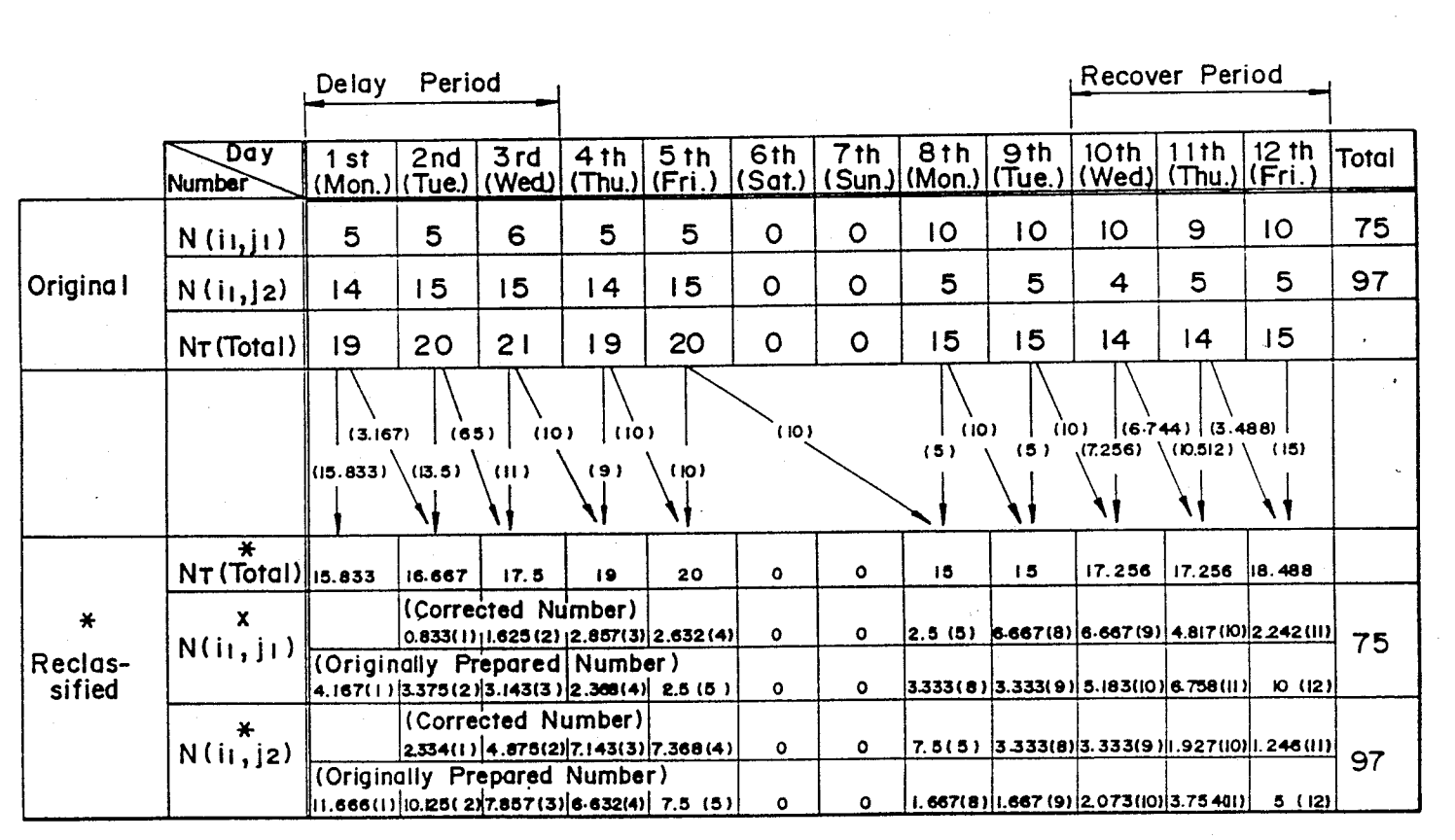

FIG. 7 shows a case wherein the production of automobiles at the destination i/1 is delayed from the original production schedule, but the production at the destination i/2 and production factory 30 are unaffected. The original production schedule is restored by distributing automobiles to be produced during his delay to subsequent working days at the destination i/1. The correction data in this case is:

In the destination i/1, the number of automobiles to be produced from the first day to the third day will be reduced by 10 from the originally planned number of products. This reduction, corresponding to ten automobiles, should be overcome by adding them to the planned number of products to be produced from the tenth working day to the twelfth day.

The products that are delayed at destination i/1 will affect the required number of engines at the production factory 30. Therefore, the required number of engines at the production factory 30 must be updated by the number of products corresponding to the production delay at the destination i/1.

By writing said corrected data into the production control system via the console 51, seven processing operations (1 through 7) are executed as follows:

(1) The system first reads the required number of engines, N(i/1, j/1) and N(i/1, j/2), of types j/1 and j/2 that are to be shipped to destination i/I. These required numbers are added in order to calculate the total required number per day. The required number per day is calculated for each of the twelve days before correction. For example, as shown in FIG. 7, the required number per day N/T for the first day is 19 which is determined by adding the required number of engines of type j/1, N(i/1, j/1) =5, to the required number of engines N(i/1, j/2) =14. Similarly, the required number N/T for the succeeding days is 20 for the second day, 21 for the third day, . . . . . and 15 for the twelfth day.

(2) Next, the total of the required numbers for the delay period (the first to third days) is determined:

19+20+21=60.

The number of engines that will not be produced is equal to 10. This number is subtracted from the total number of 60 in order to determine the actual number of engines that should be produced in the production factory 30 during the first to the third days, modifying the original number because of the delay state at the destination:

60−10 =50.

(3) The 50 engines to be produced are distributed over the delay period (the first to the third days). After the correction, the total required number per day N/T* (hereinafter called "corrected total value") will be calculated.

Corrected total value N/T* for the first day:

$$50 \times 19/60 = 15.833;$$

Corrected total value N/T* for the second day:

$$50 \times 20/60 = 6.677;\text{ and}$$

Corrected total value N/T* for the third day;

$$50 \times 21/60 = 17.5.$$

(4) Similarly, the total required number per day for the recovery period (the tenth to the twelfth days) is calculated;

$$14+14+15=43.$$

The number to be recovered, 10, is added to the above total of 43 in order to determine the total number of engines that will now be produced in the production factory 30 during the tenth to the twelfth days, which accounts for the recovery state in the destination:

$$43+10=53.$$

The 53 engines to be produced are distributed over the recovery period (the tenth to the twelfth days) in order to determine the corrected total values N/T* for each day.

Corrected total value N/T* for the tenth day:

$$53 \times 14/43 = 17.256;$$

Corrected total value N/T* for the eleventh day:

$$53 \times 14/43 = 17.256;\text{ and}$$

Corrected total value N/T* for the twelfth day:

$$53 \times 15/43 = 18.488.$$

(5) Similarly, the corrected total value N/T* is determined for each of the remaining work days (the fourth to the ninth days). As can be seen from FIG. 7, the corrected total values N/T* for the first to the twelfth days are determined to be 15.833; 16.667; 17.5; 19; 20; 0; 0; 15; 17.256; 17.256; and 18.488, respectively.

(6) Next, it is determined from which day and in what number the corrected total values N/T* are distributed with respect to the non-corrected total values N/T.

Figure 10:
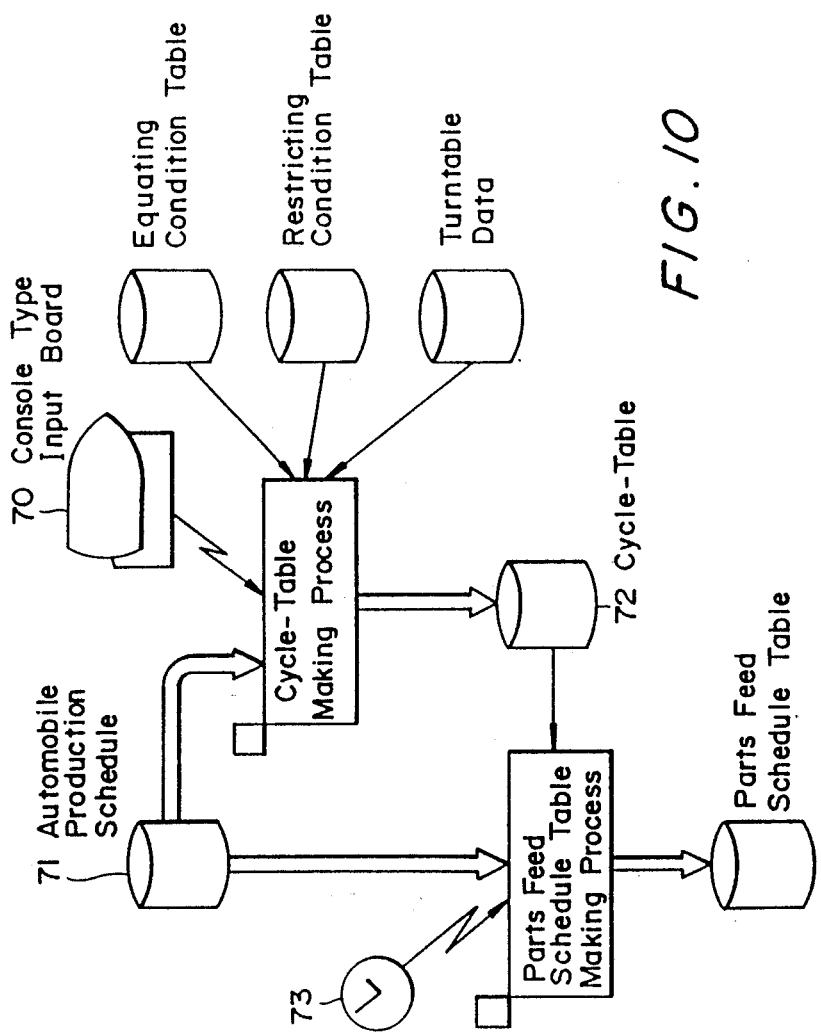
FIG. 10 is a system diagram of a preferred embodiment of the final production scheduling means constructed in accordance with the present invention.

For example, the corrected total value N/T*=15.833 for the first day is allocated from the non-corrected total value N/T=19 for the first day. It is understood that the remaining number (19−15.833=3.167) is allocated to the second day. On the other hand, the corrected total value N/T*=16.667 for the second day is achieved by including the remaining number from the first day, which is equal to 3.167. It understood that the allocated number 16.667−3.167=3.5 is obtained from the non-corrected total value, N/T=20, for the second day. As a result, the excess number of engines (20−13.5=6.5) resulting from the non-corrected total number N/T=20 for the second day will be allocated to the third day. The results of such an analysis for the first day to the twelfth day are shown in FIG. 10.

(7) The corrected total numbers N/T* thus determined are then reclassified by engine type, either j/1 and j/2. This is accomplished with the use of the results from item (6), which represents the relationship between the corrected total number N/T* and the non-corrected total value N/T. Specific examples now follow:

The required number N(i, j/1)* of engines now classified (after the correction) into type j/1 for the first day
= 15.833×5/19 = 4.167;

The required number N(i, j/2)* of engines now classified (after the correction) into type j/2 for the first day
= 15.833×14/19 = 11.666;

The required number N(i, j/1)* of engines classified (after the correction) into type j/1 for the second day
= 3.167×5/19 + 13.5×5/20 = 4.208;

The required number N(i,j/2)* of engines classified (after the correction) into type j/2 for the second day
= 3.167×14/19 13.5×15/20 = 12.459;

The required number N(i, j/1)* of engines classified (after the correction) into type j/1 for the twelfth day
= 3.488×9/14 15+10/15 = 12.242; and The required number N(i, j/2)* of engines classified (after the correction) into type j/2 for the twelfth day
= 3.488×5/15 = 6.246

EXAMPLE 2

Example 1 above was for a case where production was delayed at destination i/1. In contrast, FIG. 8 shows a case where automobile production must be increased over the original production schedule at destination i/2. This extra production will be accomplished over a weekend, when work is not normally performed. The corrected data in this case will be determined as follows:

At the destination i/2, 5 extra automobiles will be produced by extra work on the seventh day, which is a holiday, because the period from the eighth day to the twelfth day has an increased production load in the production line 41." These additional products produced at the destination i/2 will affect the number of engines required at the production factory 30. Therefore, the planned number of products to be produced at the production factory 30 should be corrected so that it takes into account the advanced production schedule at the destination i/2.

Thus, the following seven processes (1 through 7) will be executed by writing the above corrected data into the production control system via the console 51:

(1) First, the system reads from the hard disc 60 the required number of engines, N(i/2, j/2) and N(i/2, j/3), j/2 and j/3, which are to be shipped to the destination i/2. The required numbers are totaled in order to determine the required number of engines to be produced per day. In this case, the period of time influenced by the advanced from the seventh day to the twelfth day. Specific examples are given below.

Originally, the production numbers plan need for the seventh day are N(i/2, j/2)=0 and N(i/2, j/3)=0 since this day is a holiday. Therefore, its non-corrected total number N/T is equal to zero. As shown in FIG. 8, the uncorrected total numbers N/T (N(i/2, j/2) +N(i/2, j/3)) for each day of the advanced production period (the eighth day to the twelfth day) are determined to be 18; 19; 19; 18; and 18, respectively.

(2) Next, the total required numbers per day through the period of advanced production (the eighth to the twelfth days) are totaled:

$$18+19+19+18+18=92.$$

The number of extra products produced (five) is subtracted from the total value of 92 in order to determine the total number of products to be produced at the production factor 30, during the period from the eighth day to the twelfth day, in anticipation of the extra production at destination i/2:

$$92-5=87.$$

87 Products must be distributed over the advanced production period (the eighth day to the twelfth day) in order to determine the corrected total values N/T*.

The corrected total value N/T* for the eighth day is:

$$87\times 18/92=17.022.$$

The corrected total value N/T* for the ninth day is:

$$87\times 19/92=17.967.$$

The corrected total value N/T* for the twelfth day is:

$$87\times 18/92=17.022.$$

Of course, the corrected total value N/T* for the seventh day is set at 5.

From the above analysis, the corrected total numbers N/T* from the eighth day to the twelfth day are calculated to be 5; 17.022; 17.967; 17.967; 17.022; and 17.022, respectively.

(3) Subsequently, it is determined from which day and in what number the corrected total values N/T* are distributed with respect to the non-corrected total values N/T.

For example, the corrected total number N/T*=5 for the seventh day was taken from the non-corrected total value N/T=18 for the eighth day, with the remaining number, 18−5=13, still allocated to the eighth day. Therefore, the corrected total number N/T*=17.022 for the eighth day comprises 13 from the non-corrected total value of 4.022 resulting from the noncorrected total value N/T=19 for the ninth day. The remaining number:

19−4.022=14,978 is then allocated to the ninth day. Subsequently, similar calculations are performed until the twelfth day which is a final day of the production period. The results are shown in FIG. 8.

(4) Next, the corrected numbers N/T* determined above are reclassified into engine types j/2 and j/2. This is accomplished by using the results of item (3) above, which indicates the allocated value of the corrected total number N/T* from the noncorrected total value N/T for any day. The results are shown below.

The required number N(i/2, j/2)* of engines after the correction classified into type j/2 for the seventh day:

5×12/8=3.333.

The required number N(i/2, j/3)* of engines classified into type j/3 for the seventh day after the correction:

5×6/18=1.666.

The required number N(i/2, j/2)* of engines after the correction classified into type j/2 for the eighth day:

13×12/18+4.022×13/19=11.419.

The required number N(i/2, j/3)* of engines after the correction classified into type j/3 for the eighth day:

13×6/18+4.022×6/19=5.603.

The required number N(i/2, j/2)* of engines after the correction classified into type j/2 for the twelfth day:

17×12/18=11.348.

The required number N(i/2, j/3)* of engines after the correction classified into type j/3 for the twelfth day:

17.022×6/18=5.674.

(Transport Time Correcting Step 203)

At step 203, the normalization of time is accomplished by considering the transport times T/1 and T/2 necessary to travel from the production factory 30 to the destinations i/1 and i/2, respectively, these time periods have been inputted into the system at step 202. The details of such a time normalization is shown in FIG. 9.

FIG. 9 shows a case where the time required to transport products from the production factory 30 to the destination i/2 is 1.5 days; the lead time from the production start step (hereinafter called "production entering step") to the shipping step in the production factory 30 is equal to 0.5 days; the period required at the shipping step of the production factory 30 matched to the number of precedently produced products for the seventh day at destination i/1 to equal to 4-5 days; and a similar period is required at the production entering setup of the production factory 30 which is 3-5 days.

At the step 202, when the above parameters are inputted into the system through the console 51, the corresponding required numbers after correction N(i/2, j/2)*, that is, the reclassified numbers, are read from the hard disc 60. It should be noted that these reclassified numbers N(i/2, j/2)* are data that were determined at the previous step (Required Engine Number correcting Step 201) and stored in the hard disc 60. FIG. 9 shows the case where the reclassified numbers N(i/2, j/2)* of engines belonging to type j/2 are to be shipped to the destination i/2 and are read out from the hard disc 60.

The reclassified numbers N(i/2, j/2)* from the first day to the twelfth day are determined to be 3; 2; 3; 3; 3; 0; 3.333; 8.667+2.275; 10.248+1.888; 10.112+1.304; 10.696+0.652; and 11.348, respectively.

After the above correction is made, the planned number of products to be shipped from the production factory 30 is determined by shifting the reclassified numbers N(i/2, j/2)* 1.5 days earlier, which corresponds to the transport time T/2 from the production factory 30 to the destination i/2, which is where these products are to be shipped. Specifically, the shipping plan for the third day requires that the number of products to be shipped be equal to three since the reclassified number for the fourth day is equal to 1.5 and the shipping number for the fifth day is equal to 1.5. Similar operations will be performed from the first day to the twelfth day in order to ship the planned number of products for each day. As a result, the planned number of products to be shipped per day from the first day to the tenth day is calculated to be 1+1.5; 1.5+1.5; 1.5+1.5; 1.5+5.7095+1.6665; 1.6665+2.9575+8,82; 0; 0; 4.18+7.596; 4.404+6.978; or 5.022+6.326.

Since the above planned number of products to be shipped per day is equivalent to the number of products to be shipped at the shipping step in the production factory 30, the number of products to be produced at the production entering step according to the production entering plan is determined by shifting the planned number of products to be shipped per day earlier in time by the lead time of 0.5 days, which is the production entering step to the shipping step.

Specifically, the production entering plan for the eighth day now becomes 11.579, which is determined by adding the required number for the tenth day, which is 10.292, to that for the eleventh day, which is 1.287. Similar operations will be repeated for the first through twelfth days in order to produce the number of products required by the production entering plan per day.

Each group of 1.111 products is uniformly allocated to the third, fourth and fifth days since 3.333 products are to be produced by work on the holiday which corresponds to the number produced for three days, that is, the third, fourth and fifth days.

As a result, the number of products to be produced in the production entering plan for days one to nine become 1.75; 3; 3+3.21575; 7.67325+2.93125; 1.111+10.06875+1.708; 0; 0; 10.292+1.287; or 10.713+0.652. (Products Classifying and Editing Step 120)

Next, the number of products to be produced per day according to the production entering plan that was obtained at the above step is reclassified by engine type. (Final Production Plan Determining Step 205.)

The final production plan is determined on the production line 31 of the production factory 30, based on the conditions inherent in the production factory 30, which have been into the system at the producing condition input step 2094 and which will be described in detail hereinafter. As a result, the final producing plan so determined will be provided to one of the corresponding terminals 63/-1–63/-N via the network 62.

Figure 11:
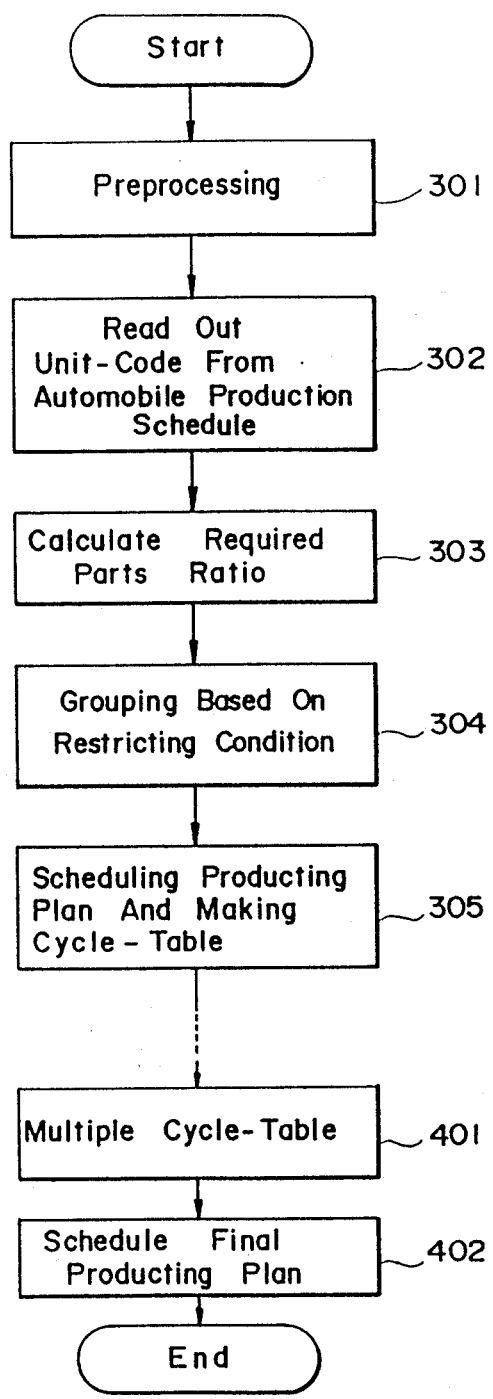
FIG. 11 is an example of a flow chart used in actuating the system shown in FIG. 10.

FIG. 10 is a diagram of a system for scheduling a final production plan determining process (205) according to the present invention. FIG. 11 illustrates a procedure for determining the arrangement and row order of the combination codes used in the present invention.

The method of the present invention can be broadly divided into two procedures: the first procedure involves making a cycle table which determines the arrangement and row order of the combination codes in a delivery or feed cycle. The second procedure involves the making of a parts feed schedule table for a given period. For example, for each day from said cycle table. The actual delivery of parts onto the assembly line will be performed in accordance with the parts feed schedule table.

An example of the combination codes that are assigned to products with different specifications will be described with reference to FIG. 12.

Figures 12, 13, 14:
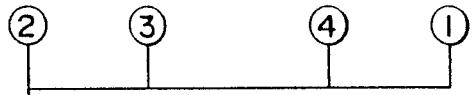
FIG. 12 exemplifies a combination code group used in the present invention.
FIG. 13 exemplifies a restraint condition that used when the present invention is applied to assemble automobiles.
FIG. 14 exemplifies an equating condition that is sued when the present invention is applied to assemble automobiles.

A combination code shown in FIG. 12 consists of 10 units each of which has a mark formed by a numeral or a letter. A specific code is given to a product with a desired specification and it represents the various characteristics of a specific engine such as the engine type, engine capacity, EFI or carburetor, engine bore size as well as other characteristics.

If the parts that correspond to these marks are delivered to the production line, a product with the desired specification, such as s an automobile or engine,i can be produced on the production line after one revolution.

The operation of the system shown in FIG. 20 will now be described with reference to the flow chart shown in FIG. 11.

A start signal is first inputted into the system through an operator's console 70 to initiate the process of making a cycle-table. Step 301 in FIG. 11 is a preprocessing step which includes steps for reading an equipment limiting condition table, a restraint condition table, and an equating condition table.

In accordance with the present invention, the equipment limiting condition includes places through a delivery or feed cycle. For example, if 100 table places are used in an assembly line, a cycle table would be prepared with respect to 100 feed cycles.

An example of a restraint condition table is shown in FIG. 13, in which the given restricting conditions are applied to the first, third, sixth and eighth units of the combination code.

Each of the units has a priority order which is established by making a cycle table, to be described, so that the restraint conditions of the eighth, first, third and sixth units can be fulfilled in the order described.

The restricting codes shown in FIG. 13 mean that, for example, in the first unit, a part appended by a code "E" or "T" must not be delivered in succession after a part appended by a code "E". Similarly, the first unit has a restricting condition that a part appended by a code "T" or "E" must not be delivered in succession after a part appended by a code "T".

FIG. 14 shows an example of an equating condition table in which equating conditions are allocated as in FIG. 13, only to the first, third, sixth and eighth units, with their priority orders also established. The equating codes in FIG. 14 are interpreted to mean that, for example, in the first unit, parts "E" and "T" must be distributed in a cycle as uniformly as possible.

When the pre-processing step 301 is completed, combination codes are determined at step 302. Subsequently, the contents of a production plan table 71 are inputted into the system. This table includes the planned number of products to be produced per day in accordance with the production plan for each of product types previously stored in the auxiliary memory of a computer. A combination code corresponding to one of these necessary products is then stored therein.

Thus, the determination of combination unit codes at step 302 will establish the combination codes shown in FIG. 12 for the respective products.

FIG. 15 shows unit symbols that are read from said production plan table 71 as well as the production plan numbers and also that about 50 specifications are provided for about 1,500 products planned per day after they are classified.

Step 303 determines the parts ratio required to fulfill said restraint and equating conditions according to the planned number of products to be produced and the combination codes which have been read in the system.

In accordance with the present invention, such a parts ratio can be determined as as feed ratio for each of the combination codes to fulfill the restraint and equating conditions in a delivery or feed cycle corresponding to one assembly line cycle In the illustrated embodiment, the feed cycle includes 100 places. Thus, an incidence ratio of combination codes requesting the restraining and equating conditions among the 100 places is calculated.

FIG. 16 shows a step that is executed in the course of determining this ratio, in which added to the planned number of products to be produced are the units necessary to fulfill the restraint and equating conditions.

Units which do not request the restraining and equating conditions, for example, the seventh, ninth and tenth units are appended by optional marks @. It is thus understood that the summing process is effected by each condition.

FIGS. 17A–17E illustrate a procedure for determining the feed ratio in the feed cycle from the total value of FIG. 16.

FIG. 17A shows a ratio determined for the eighth unit which has first priority. It is important in the present invention that when a feed ratio for each of the unit codes in the feed cycle is determined, the respective places forming this feed cycle are distributed with the feed ratio. Fractions created at this time are collected to form an unreserved place. In FIG. 17A, one place is marked by a "? ", indicative of an unreserved place.

FIG. 17B illustrates the determination of a ratio for the first unit having second priority, wherein fractions are collected to form an unreserved place as was done in the eighth unit.

Subsequently, ratios are calculated for the third unit in FIG. 17C and the sixth unit in FIG. 17D in accordance with their order of priority. FIG. 127E shows the final feed ratio in the feed cycle Which is represented by an integral number.

After the feed ratios are determined as in FIG. 17, the combination codes will be dispersed within the feed cycle in said ratios in accordance with the restraint and equating conditions. Before this operations, however, the restraint conditions are grouped at step 304. As is apparent from FIG. 13, the codes in each of the units are divided into a restraint group and an unrestraint group. FIG. 18 shows the ratios that are obtained when the ratios of FIG. 17E are divided into a restraint group and an unrestraint group according to the equating condition. As seen from FIG. 18, the mark "? " is considered a restricting code.

At step 305, the final production plan is finally determined based on the restraint and equating conditions in order to determine a cycle table 72.

FIG. 19 shows an example of the development of the final production plan at step 305.

One feature of the present invention is that the preparation of the feed cycle establishes the row order of the basic combination codes that correspond to the 100 places in the illustrated embodiment, independent of the total production number for a given period, (for example, one day). By repeating such a cycle table, the restraint or equating condition can always be uniformly fulfilled even if the total production number is increased. When making the cycle table, the regular dispersion can be performed by actually ensuring that fractions in the feed cycle are collected in unreserved places.

As will be described, the determination of the specific contents of said unreserved places is such that the uniform dispersion of the restraint or equating conditions can be effected when the overall production schedule is determined at a step next to the determination of the cycle and if the unreserved places are observed throughout.

FIG. 19 shows several early determining steps of the production schedule wherein units loaded by the restraint and equating conditions are arranged from the highest priority order to the lowest priority order. Codes used by these units are shown, for example, for the eighth unit, to be "0", "1", "2", "7" and "?". Among these codes, the restricting codes are circled by solid line while the unrestricting codes are circled by dotted line.

The first order determining step uses the ratio of FIG. 17E as it is. In those case, a group of codes fulfilling the restraint conditions are first selected and used to obtain codes fulfilling the equating conditions for each of the units. FIG. 19 shows that the codes are selected from the largest ratio to the smallest ratio and denoted by star-shaped marks.

Therefore, the combination code first adopted in the system become / / / /2E-E ? 0 ? ? ".

The second and subsequent determinations are executed as follows:

During the second and subsequent determinations, larger ratios are selected in order after the restraint and equating conditions have been fulfilled. At this time, the ratio is calculated according to the following equation after the first selection has been made:

$$P/n = P/n\text{-}1 + P/1 - 100$$

where the first ratio is P/1 and the n-th ratio is P/n with respect to the codes which were adopted in the preceding selection for each unit. Therefore, the second selection can be represented by:

$$53 + 53 - 100 = 6$$

since the first ratio is equal to 53.

On the other hand, a code which has not been adopted in the preceding selection is represented by:

$$P/n = P/n\text{-}1 + P/1.$$

For example, the code "I" in the eighth unit is equal to 16 according to the second ratio since the first ratio is equal to 8.

In this manner, all the units are calculated. When the highest of these ratios is selected to match to the said conditions, the code with the star-shaped mark will be selected.

Similar selections for the third and fourth ratios are made in order to determine the combination codes for their respective ratios FIG. 20 illustrates a cycle table which was determined by using such an operation.

As seen from FIG. 20, unreserved places "? " are arranged in the sixth and 92nd codes, respectively. When unreserved places are dispersed within the feed cycle in such a manner, the dividable allocation, that is, the allocation having no fraction, can be completed in the feed cycle.

A procedure for making an actual, final production plan table from the cycle table thus obtained will be described below.

In fact, the operation of creating the final production schedule starts with a system timer 73 at a given time before the production is initiated (for example, for a day). At step 401, first, the contents of said cycle table 72 are read out by a total amount of products planned per day.

In the embodiment of the present invention, the number of products per day is equal to 1.532 multiplied by 15.32 cycles since one cycle table is provided for each of the 100 products.

Even though the planned number of products to be produced is huge, a determination of the order is not required for each product as in the prior art, which would be 1,532 products in the embodiment. Therefore, in accordance with the present invention, there is an advantage in that the determination of the order can be extremely simplified.

Step 402 is the actual scheduling of the final producing plan which is used to determine the unreserved places in each of the cycles. As described, since unreserved place corresponding to fractions are dispersed in the cycle table, it is the scheduling operation at step 402 that properly establishes the unreserved places within the overall program.

The final producing plan scheduling operation is accomplished in the same manner as was done in step 305 for establishing the aforementioned cycle table. It determines the order of the subsequent unreserved places by taking into account the restraint condition, the equating condition and the ratio.

The number of unreserved places required in the final production plan scheduling operation is very small in comparison with the overall number of unreserved places. thus,. the determination of the unreserved places itself can be advantageously performed for a very short period of time.

FIG. 21 shows an example of the final producing plan scheduling table that is obtained. From FIG. 21, it is seen that the third and sixth units of the sixth selection, which had been unreserved places in FIG. 20, are now arranged in the proper order according to the desired combination codes.

By using the two procedures for making the cycle table and determining the orders, the present invention can very simply establish the arrangement and row order of all the combination codes.

A limiter may be provided which can remove a code from an object to be processed when a reminder is equal to zero after the subtraction of the adopted number from the planned number of products to be produced for each of the combination codes adopted in determining the order. It is thus ensured that any inconsistency between the planned number of products that are to be produced and the actual number of products produced can be eliminated.

Although the above description has been directed to the production of automobiles or vehicle engines, the present invention may be applied broadly to the assembly or work of all other instruments or machines.

As described, the present invention determines a basic flow pattern of combination codes by using feed cycles which are established by row lines and repeats the flow pattern times corresponding to the planned number of products to be produced per day to equalize the program throughout. As a result, unacceptable products that are restrained by an inconvenient restricting condition or an undesirable equating condition will not be concentrated into a specific section, for example, the rearward half of the production line. Accordingly, the present resent invention can advantageously plan a production schedule having a very uniform equating condition.

Furthermore, the present invention can provide a physical distribution of products in the proper quantities and in the most efficient manner and then improve the efficiency of the present production associated with the physical distribution.

We claim:

1. A production control system for use in a production factory to deliver a required number of parts corresponding to a plurality of different types of products to each of plural destinations which are spaced from said production factory and require different transport times, said system having means for providing a schedule of parts corresponding to each type of product to the production line of said production factory, said system comprising:

means for recording correcting data corresponding to the progress of said parts in said production line;

means for recording the required number of part, the different types of products, schedule times of shipping said parts, and parts correcting means for correcting said required number of parts based on said correcting data;

means for recording transport time correcting data for each product to its respective destination;

transport time correcting means for further correcting said required number of parts based on said transport time correcting data; and final production plan scheduling means for providing the corrected required number of parts, and a corrected schedule for shipping products to said destination.

2. A production control system as defined in claim 1 wherein said parts correcting means includes means for recording data indicative of delayed products for each of the destinations and means for redistributing the delayed products across said schedule.

3. A production control system as defined in claim 2 wherein said schedule includes a number of days in a preselected period, and said parts correcting means includes means for redistributing the number of delayed products over days in a delayed period and distributing the number of parts to be recovered through days in a recovery period which is set in the latter half of the production schedule.

4. A production control system as defined in claim 1 wherein said parts correcting means includes means for correcting data indicative of the number of products initially produced in a prior period relative to the original schedule and for allocating the number of products so produced in said production factory to each of the days which belong to the corresponding period of previously produced products.

5. A production control system as defined in claim 1 wherein said production factory includes a production in claim 1 wherein said production factory includes a production entering step and a shipping step, and said transport time correcting means includes means for determining the number of products to be produced for the transport time required to transport products from the production factory to each of the destinations and a lead time from said production entering step to a second shipping step.

6. A production control system for use in a production factory having a production line for delivering a required number of parts belonging to a plurality of types of products to each of plural destinations which are spaced from said production factory to require different transport times, said system having means for displaying the number of scheduled shipping products belonging to each of said types of products to the production line of said production factory, said system comprising:

means for recording parts correcting data relating to progress of parts in said production line and of products to said destination;

required number correcting means for correcting said required number of parts based on said correcting data;

means for recording parts transport time correcting data corresponding to differences between transport times to said destination of each of said products;

transport time correcting means for further correcting said required number of parts based on said transport time correcting data; and final production plan scheduling means for developing the corrected required number of parts based on said parts correcting data and said transport time correcting data;

said final production plan scheduling means including means for delivering parts having specifications selected from the same kind of parts in a given order to a plurality of operating tables which are arranged along an assembly line and for determining the arrangement of a combination code and the row order of a combination code group which are used to determine parts to be delivered to each of said operating tables so that products different from one another can be produced in the assembly line operation by congregating assembled or worked parts on each of the operating tables in the assembly line through a round, said final production plane scheduling means having means for determining a feed ratio for each part in a feed cycle corresponding to one assembly line cycle from the required number correcting means based on the production schedule, for allocating parts in said feed cycle in said feed ratio with fraction created therein being collected to form an unreserved area, for determining the arrangement of a combination code and a row order of a combination code group in each of the feed cycles.

7. A production control system as defined in claim 6 wherein the number of places in the parts feed cycle is equal to the number of places in one assembly line cycle.

8. A production control system as defined in claim 6 wherein the arrangement of a combination code and the row order of a combination code group in each of the feed cycles are determined by performing a selection in an order starting from the largest ratio after restraint and equating conditions have been fulfilled.

9. A production control system as defined n claim 8 wherein said ratio is provided with respect to the code adopted in said selection by $$P_n = P_{n-1} + P_1 - 100$$

where $P_1$ is a ratio in the first selection and $P_n$ is a ratio in the n-th selection and with respect to the code not adopted in the previous selection by $$P_n = P_{n-1} + P_1.$$

* * * * *

UNITED STATES PATENT AND TRADEMARK OFFICE
CERTIFICATE OF CORRECTION

PATENT NO. : 4,958,292 Page 1 of 4
DATED : 18 September 1990
INVENTOR(S) : Kuniya KANEKO et al.

It is certified that error appears in the above-identified patent and that said Letters Patent is hereby corrected as shown below:

| Column | Line | |
|---|---|---|
| 2 | 14 | Change "parts, i the" to --parts, i.e., the--. |
| 2 | 27 | After "factory" (second occurrence) insert --")--. |
| 2 | 28 | Change "sometimes)" to --sometimes-- |
| 2 | 48 | Change "produced,i which" to --produced, which--. |
| 2 | 52 | Change "Thus,i different" to --Thus, different--. |
| 2 | 63 | Change "ion" to --in--. |
| 2 | 68 | Change "as" to --an--. |
| 3 | 40 | Change "ar" to --art--. |
| 6 | 21 | Change "tion. The" to --tion, the-- |
| 7 | 9 | Change "factor" to --factory--. |
| 7 | 10 | Before "capacity" insert --required-- |
| 7 | 16 | Change "times,i the" to --times the-- |
| 7 | 18 | Change "on" to --to--. |
| 7 | 19 | Before "capacity" insert --required-- |

UNITED STATES PATENT AND TRADEMARK OFFICE
CERTIFICATE OF CORRECTION

PATENT NO. : 4,958,292

DATED : 18 September 1990

INVENTOR(S) : Kuniya KANEKO et al.

It is certified that error appears in the above-identified patent and that said Letters Patent is hereby corrected as shown below:

| Column | Line | |
|---|---|---|
| 7 | 20 | Change "furthermore" to --Furthermore--. |
| 7 | 28 | Change "ca" to --can--. |
| 8 | 45 | Change "an" to --and--. |
| 8 | 46 | After "total" delete "9". |
| 9 | 13 | After "that" insert --is--. |
| 9 | 16 | Change "sued" to --used--. |
| 9 | 50 | After "will" delete "not". |
| 10 | 30 | After "is" delete "as". |
| 11 | 44 | Change "his" to --this--. |
| 12 | 12 | Change "10" to --10--. |
| 12 | 13 | Change "60" to --60--. |
| 12 | 19 | Change "50" to --50--. |
| 13 | 15 | Change "3.5" to --13.5--. |
| 13 | 44 | After "14" insert -- + --. |
| 14 | 9 | Before "influenced" insert --required to determine the required number of engines to be produced per day is from the seventh day to the twelfth day, which days are--. |

UNITED STATES PATENT AND TRADEMARK OFFICE
CERTIFICATE OF CORRECTION

PATENT NO. : 4,958,292
DATED : 18 September 1990
INVENTOR(S) : Kuniya KANEKO et al.

It is certified that error appears in the above-identified patent and that said Letters Patent is hereby corrected as shown below:

| Column | Line | |
|---|---|---|
| 14 | 10 | After "advanced" delete "from the seventh day to the twelfth day" and insert --production--. |
| 14 | 29 | Change "factor" to --factory--. |
| 14 | 48 | Change "87 X 18/92 = 17.022." to --87 X 18/92 = 17.022.--. |
| 15 | 2 | Change "14,978" to --14.978--. |
| 15 | 16 | Change "5 X 12/8 = 3.333" to --5 X 12/18 = 3.333--. |
| 16 | 27 | Change "8,82;" to --8.82;--. |
| 16 | 64 | After "been" insert --inputted--. |
| 16 | 65 | Change "2094" to --204--. |
| 17 | 28 | After "as" delete "s"; after "engine," delete "i". |
| 18 | 20 | Delete "as" (second occurrence). |
| 18 | 23 | After "cycle" insert --.--. |
| 18 | 55 | Change "Which" to --which--. |

UNITED STATES PATENT AND TRADEMARK OFFICE
CERTIFICATE OF CORRECTION

PATENT NO. : 4,958,292                  Page 4 of 4
DATED : 18 September 1990
INVENTOR(S) : Kuniya KANEKO et al.

It is certified that error appears in the above-identified patent and that said Letters Patent is hereby corrected as shown below:

| Column | Line | |
|---|---|---|
| 19 | 35 | Change "case," to --cases,--. |
| 20 | 52 | Change "thus,.the" to --Thus, the--. |
| 20 | 66 | Change "reminder" to --remainder--. |
| 21 | 20 | Change "resent" to --recent--. |
| 21 | 40 | Change "part," to --parts,--. |
| 21 | 64 | Change "through" to --over--. |
| 22 | 9 | Delete entire line. |
| 22 | 10 | Delete "production". |
| 22 | 64 | Change "fraction" to --fractions--. |
| 24 | 1 | After "defined" change "n" to --in-- |

Signed and Sealed this

Ninth Day of June, 1992

*Attest:*

DOUGLAS B. COMER

*Attesting Officer*      *Acting Commissioner of Patents and Trademarks*